(12) United States Patent
Stenlund

(10) Patent No.: US 7,893,826 B2
(45) Date of Patent: Feb. 22, 2011

(54) ALARM SYSTEM

(75) Inventor: Peter Stenlund, Saltsjö-Boo (SE)

(73) Assignee: Vendolocus AB, Stockholm (SE)

( * ) Notice: Subject to any disclaimer, the term of this patent is extended or adjusted under 35 U.S.C. 154(b) by 0 days.

(21) Appl. No.: 10/587,332

(22) PCT Filed: Feb. 7, 2005

(86) PCT No.: PCT/SE2005/000170

§ 371 (c)(1),
(2), (4) Date: Jul. 26, 2006

(87) PCT Pub. No.: WO2005/076238

PCT Pub. Date: Aug. 18, 2005

(65) Prior Publication Data

US 2007/0188321 A1    Aug. 16, 2007

(30) Foreign Application Priority Data

Feb. 5, 2004    (SE)    .................................. 0400232

(51) Int. Cl.
G08B 19/00    (2006.01)
G08B 23/00    (2006.01)
G08B 21/00    (2006.01)
G08B 13/08    (2006.01)
G10L 21/00    (2006.01)
G01V 3/00    (2006.01)

(52) U.S. Cl. ........................ 340/521; 340/517; 340/540; 340/545.1; 340/573.1; 704/273; 702/2

(58) Field of Classification Search .................. 340/540, 340/573.1

See application file for complete search history.

(56) References Cited

U.S. PATENT DOCUMENTS 4,845,464 A    7/1989    Drori et al.

(Continued)

FOREIGN PATENT DOCUMENTS

WO    01/22701    3/2001

OTHER PUBLICATIONS

International Search Report for PCT/SE2005/000170 dated May 13, 2005.

(Continued)

Primary Examiner—George A Bugg
Assistant Examiner—Jack Wang
(74) Attorney, Agent, or Firm—Nixon & Vanderhye P.C.

(57) ABSTRACT

The present invention relates to an alarm system intended to trigger an alarm signal upon deviation from at least one environment-dependent reference predetermined for a specific environment. The alarm system comprises at least one portable unit intended to be placed in said environment, which unit has a size corresponding to a mobile telephone. Each unit comprises a sensor system adapted for detecting different states comprising at least vibrations. Furthermore, the alarm system comprises a processor member connected to the sensor system and adapted for the comparison of signals received from the sensor system and said predetermined environment-dependent reference/references. The alarm system further comprises a communication member connected to the processor member and adapted for wireless communication upon, for instance, the triggering of an alarm signal. Furthermore, the alarm system comprises a memory member connected to the processor member via a distributed computer network and adapted for the storage of said predetermined reference/references.

20 Claims, 6 Drawing Sheets

U.S. PATENT DOCUMENTS

| | | | |
|---|---|---|---|
| 5,552,763 A | 9/1996 | Kirby | |
| 5,552,773 A * | 9/1996 | Kuhnert | 340/573.1 |
| 5,578,988 A * | 11/1996 | Hoseit et al. | 340/522 |
| 5,917,433 A * | 6/1999 | Keillor et al. | 340/989 |
| 6,263,311 B1 * | 7/2001 | Dildy | 704/273 |
| 6,377,179 B1 | 4/2002 | Fulton | |
| 6,459,365 B2 * | 10/2002 | Tamura | 340/425.5 |
| 7,126,464 B2 * | 10/2006 | Harvey | 340/471 |
| 7,263,379 B1 * | 8/2007 | Parkulo et al. | 455/521 |
| 2001/0044588 A1 * | 11/2001 | Mault | 600/549 |
| 2001/0050612 A1 * | 12/2001 | Shaffer | 340/521 |
| 2002/0028704 A1 * | 3/2002 | Bloomfield et al. | 463/1 |
| 2003/0125890 A1 * | 7/2003 | Nagamatsu | 702/77 |
| 2003/0163287 A1 * | 8/2003 | Vock et al. | 702/187 |
| 2004/0086091 A1 * | 5/2004 | Naidoo et al. | 379/37 |
| 2004/0087839 A1 * | 5/2004 | Raymond et al. | 600/300 |
| 2004/0113778 A1 * | 6/2004 | Script et al. | 340/545.1 |
| 2004/0253926 A1 * | 12/2004 | Gross | 455/67.11 |
| 2005/0080566 A1 * | 4/2005 | Vock et al. | 702/2 |
| 2005/0131705 A1 * | 6/2005 | Gandhi et al. | 704/273 |

OTHER PUBLICATIONS

International Preliminary Report on Patentability completed Apr. 10, 2006.

* cited by examiner

ALARM SYSTEM

This application is the U.S. national phase of International Application No. PCT/SE2005/000170 filed 7 Feb. 2005, which designed the U.S. and claims priority to SE 0400232-5 filed 5 Feb. 2004, the entire contents of each of which are incorporated herein by reference.

FIELD OF THE INVENTION

The present invention relates, according to a first aspect, to an alarm system intended to trigger an alarm signal upon deviation from at least one environment-dependent reference predetermined for a specific environment.

According to a second aspect, the present invention relates to a method for triggering an alarm signal by means of an alarm system.

According to a third aspect, the present invention relates to at least one computer software product for triggering an alarm signal.

BACKGROUND OF THE INVENTION

The document U.S. Pat. No. 6,639,512 discloses a system for protecting the passengers in a stationary motor vehicle, in particular lonely children and pets, from dangerous states that are found within the vehicle. The system comprises a sensor, which detects dangerous environmental states, such as high temperatures in the vehicle. In the preferred embodiment, the sensor is used with a transmitter in order to continuously transmit sound detected within the passengers' accommodation of the vehicle as well as to transmit information about the existence of any dangerous states to a person being at a distance. In a second embodiment, dangerous states trigger an alarm connected to the vehicle. The alarm amplifies the sound detected in the vehicle, such as a crying child or a barking dog and produces also a standard alarm sound alternated with an amplified speech that explains the dangerous state as well as amplifies the sound inside the vehicle, such as a crying child. A third embodiment of the invention comprises an environmental warning module, which may be fastened on a wireless telephone. When a dangerous state is detected, the module uses the wireless telephone in order to report a message to a person being at a distance. The message is reported via another telephone or via a pager.

A disadvantage of the above-mentioned known system is that it is not a flexible solution. The solution is only aimed at detecting dangerous states in a stationary vehicle. Another disadvantage is that the system is not dynamic and cannot be updated automatically.

The document U.S. Pat. No. 6,441,731 discloses a portable alarm system for the use in a dwelling, boat, office or any other structure that may benefit from safety surveillance. The portable alarm system 10 is included in a portable casing 12. The alarm system 10 comprises a keyboard panel 14 connected to a microprocessor 20. The keyboard panel 14 may, among other things, be used in order to program the alarm system 10 according to specific user needs. A timing light 16 is preferably included in the casing 12. The alarm system 10 can initiate a call to a safety surveillance station by means of, for instance, wireless technology. The alarm system 10 may also comprise a vibration/impact sensor in order to activate the alarm functions if the portable unit is moved or if attempts are made to destroy the portable unit.

A disadvantage of the above-mentioned known alarm system is that it is relatively bulky since it, among other things, comprises a keyboard panel. Another disadvantage is that the alarm system is not dynamic and cannot be updated automatically.

The known solutions shown above are partly or completely impaired by the disadvantages listed below.
They are space-requiring and cannot be placed optionally.
The solutions are expensive.
Cannot be controlled from optional stationary or mobile telephone as well as radio unit.
Do not indicate the position.
They have no so-called "black box function".
They do not comprise any database.
The solutions are not dynamic or interactive, and cannot be controlled via web or wap.
The solutions comprise buttons and/or displays that make them dearer and constitute sources of error as well as make it more difficult for users.
The solutions are difficult or impossible to mount in hidden installation types, in arbitrarily chosen environment.
No universal standard solution for mobile or stationary applications, where it is intended to, e.g., count pulses, measure vibrations, shocks, impacts and/or sound waves.
The shown solutions are static and show no flexibility regarding dynamic software possible to update.
Only statically mechanical solutions, without modules having data buses, which are not adaptable over time. This means that modified conditions require tailor-made special solutions.
The shown solutions cannot be used in exposed environments as, e.g., open boats, outboard motors, lawn-mover tractors and tool boxes.
The solutions lack "intelligence" in order to "record" the specific pre-conditions of the environment in order to get their unique configuration and unique rules.
The solutions comprise no wireless "man-overboard functions".
The systems according to the solutions cannot easily be connected to industrial system structures.
The solutions cannot detect acceleration, retardation and carry out measurement of position by means of relative translation, speed, distance and time.
The solutions have no log functions, neither in activated nor in deactivated state.
The solutions cannot be combined with, for instance, a sea chart plotter.

SUMMARY OF THE INVENTION

The object of the present invention is to solve the above-mentioned problems. This is achieved by an alarm system intended to trigger an alarm signal upon deviation from at least one environment-dependent reference predetermined for a specific environment, according to claim 1. The alarm system comprises at least one portable unit intended to be placed in said environment, which unit has a size not greater than a mobile telephone. Each unit comprises a sensor system adapted for detecting different states, comprising at least one of vibrations relative position changes or accelerations. Furthermore, each unit comprises a processor member connected to the sensor member and adapted for the comparison of signals received from the sensor system and said predetermined environment-dependent reference/references. Furthermore, each unit comprises a communication member of a unique identity connected to the processor member and adapted for wireless communication upon, for instance, the triggering of an alarm signal. Furthermore, each unit comprises a positioning member connected to the processor member and adapted to indicate, at least upon the triggering of an alarm signal, the position of said unit. Furthermore, the alarm system comprises a memory member connected to the processor member via a distributed computer network and adapted for the storage of said predetermined reference/references.

By means of the alarm system according to the present, a very flexible solution invention is obtained, which fits a number of different applications. Another substantial advantage is that the alarm system according to the present invention is dynamic and can be updated automatically.

In this connection, an additional advantage is obtained if the memory member furthermore is adapted for dynamic and interactive update and development for different purposes by maneuvering via fixed and/or mobile telephony and/or radio and/or computer unit.

In this connection, an additional advantage is obtained if the sensor system comprises at least one of the following sensors: accelerometer/silicon crystal, microphone, frequency transmitters, strain gauges, camera, temperature sensors, UV/photocells, electronic noses, anemometers, infrared sensors, gamma transducers, laser sensors, inductive sensors, flow sensors, level transducers, tension gauges and pressure gauges.

In this connection, an additional advantage is obtained if each positioning member consists of at least one of the following units: GPS unit, GPRS unit and GSM unit.

In this connection, an additional advantage is obtained if said predetermined reference could consist of a sound/vibration image specific to each portable unit.

In this connection, an additional advantage is obtained if each unit comprises at least one basic module, as well as a protecting cover.

An additional advantage is obtained in this connection if the memory member is adapted for continuous storage of comparisons and/or continuous storage of deviations.

In this connection, an additional advantage is obtained if the memory member consists of a database.

The above-mentioned problems are also solved by a method for reading-out an alarm signal by means of an alarm system comprising the steps of:
  by means of the sensor system detecting different states comprising at least one of vibrations relative position changes or accelerations;
  comparing the signals received from the sensor system and at least one environment-dependent reference predetermined for a specific environment and stored in the memory member;
  upon deviation from said environment-dependent reference/references, triggering an alarm signal; and
  according to instantaneous control or predetermined configuration, by means of the communication member of a unique identity, transmitting a message to at least one receiver; and
  according to instantaneous control or predetermined configuration, by means of the positioning member, determining the position of the unit; and
  transmitting the position to the receiver/receivers.

In this connection, an additional advantage is obtained if the detection step comprises:
  the detection of different states by means of at least one of the following sensors: accelerometer/silicon crystal, microphone, frequency transmitters, strain gauges, camera, temperature sensors, UV/photocells, electronic noses, anemometers, infrared sensors, gamma transducers, laser sensors, inductive sensors, flow sensors, level transducers, tension gauges and pressure gauges.

In this connection, an additional advantage is obtained if the positioning step comprises:
  the determination of the position by means of at least one of the following units: GPS unit, GPRS unit and GSM unit.

In this connection, an additional advantage is obtained if the method furthermore comprises the step of:
  registering and in the memory member storing the reference/references that may consist of a sound/vibration image specific to each unit.

The above-mentioned problems are furthermore solved by at least one computer software product that is directly downloadable in the internal memory of at least one digital computer, the software product comprising software code portions for executing the steps of the foregoing method for reading-out an alarm signal by means of an alarm system, when said at least one product is run on said at least one computer.

The invention will now be described more in detail, reference being made to preferred embodiments of the same and reference furthermore being made to the accompanying drawings.

DETAILED DESCRIPTION OF EMBODIMENTS

Figure 1:
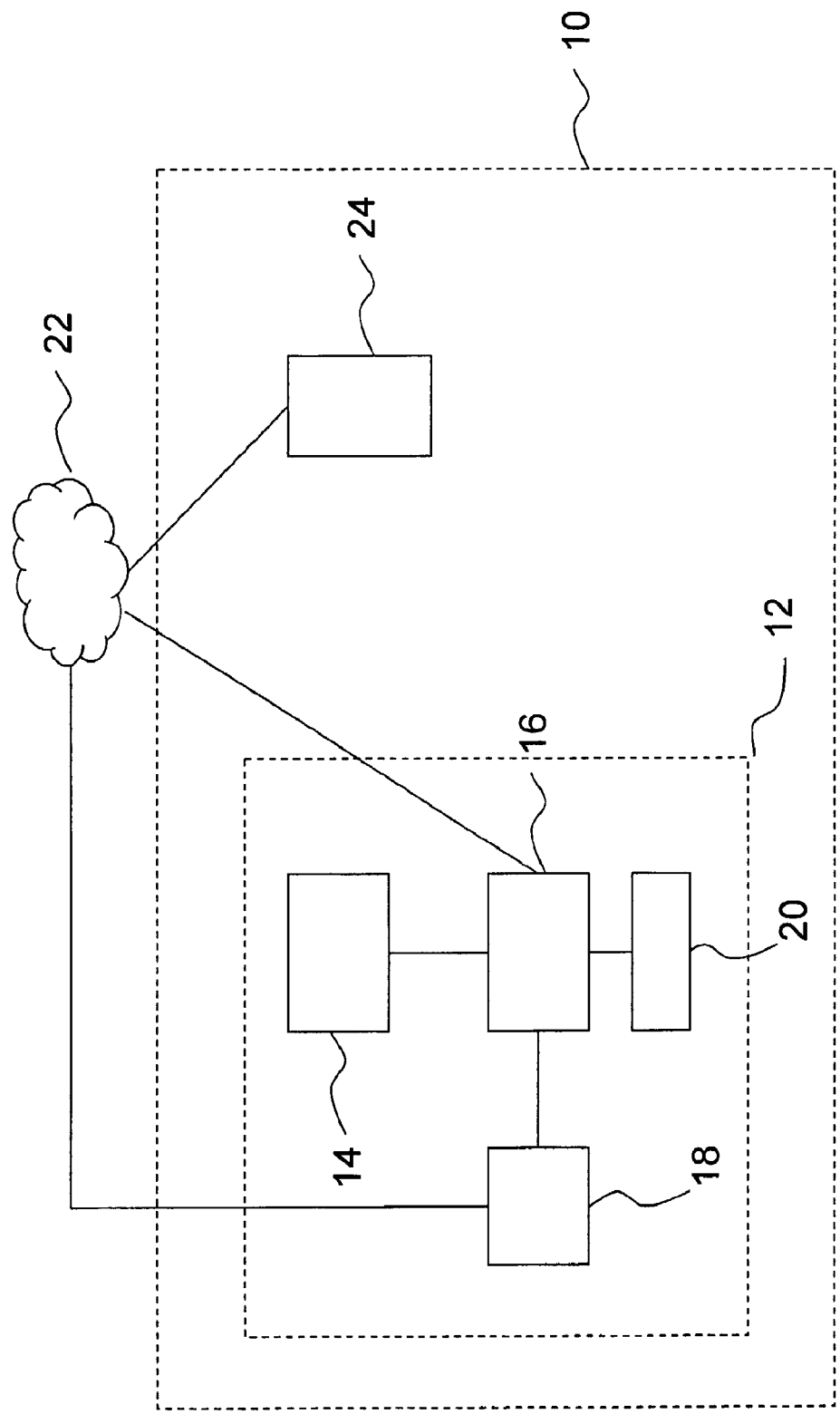
FIG. 1 shows a block diagram of an alarm system according to the present invention.

In FIG. 1, a block diagram is shown of an alarm system 10 according to the present invention. The alarm system 10 is intended to trigger an alarm signal upon deviation from at least one environment-dependent reference predetermined for a specific environment. The alarm system 10 comprises at least one portable unit 12 intended to be placed in said environment. For the sake of simplicity, only one portable unit 12 is shown in FIG. 1, but it is pointed out for the sake of completeness that the number of portable units 12 may be any number suitable for a specific application. Each portable unit 12 has a size not greater than a mobile telephone. As is seen in FIG. 1, each portable unit 12 comprises a sensor system 14 adapted for detecting different states comprising at least one of vibrations relative position changes or accelerations. Furthermore, each portable unit 12 comprises a processor member 16 connected to the sensor system 14 and adapted for the comparison of signals received from the sensor system 14 and said predetermined, environment-dependent reference/references. Furthermore, each portable unit 12 comprises a communication member 18 of a unique identity connected to the processor member 16 and adapted for wireless communication upon, for instance, the triggering of an alarm signal. As is seen in FIG. 1, each portable unit 12 further comprises a positioning member 20 connected to the processor member 16 and adapted for, at least upon the triggering of an alarm signal, indicating the position of said portable unit 12. The alarm system 10 further comprises a memory member 24 connected to the processor member 16 via a distributed computer network 22 and adapted for the storage of said predetermined reference/references. As is furthermore seen in FIG. 1, the communication member 18 may communicate via the distributed computer network 22, which, for instance, may be the Internet.

According to a preferred embodiment of the alarm system 10 according to the present invention, the memory member 24 is further adapted for dynamic and interactive update and development for different purposes by maneuvering via fixed and/or mobile telephony and/or radio and/or computer unit.

According to a preferred embodiment of the alarm system 10 according to the present invention, the sensor system 14 comprises at least one of the following sensors: accelerometer/silicon crystal, microphone, frequency transmitters, strain gauges, camera, temperature sensors, UV/photocells, electronic noses, anemometers, infrared sensors, gamma transducers, laser sensors, inductive sensors, flow sensors, level transducers, tension gauges and pressure gauges.

According to a preferred embodiment of the alarm system 10 according to the present invention, each positioning member 20 consists of at least one of the following units: GPS unit, GPRS unit and GSM unit.

According to a preferred embodiment of the alarm system 10 according to the present invention, said predetermined reference may consist of a sound/vibration image specific to each portable unit 12. (Compare FIG. 4).

According to a preferred embodiment of the alarm system 10 according to the present invention, each portable unit 12 comprises at least one basic module $12_1$, as well as a protecting cover $12_n$. (Compare FIG. 2).

According to a preferred embodiment of the alarm system 10 according to the present invention, the memory member 24 is adapted for continuous storage of deviations and/or continuous storage of comparisons.

According to a preferred embodiment of the alarm system 10 according to the present invention, the memory member 24 consists of a database 24.

Figure 2:
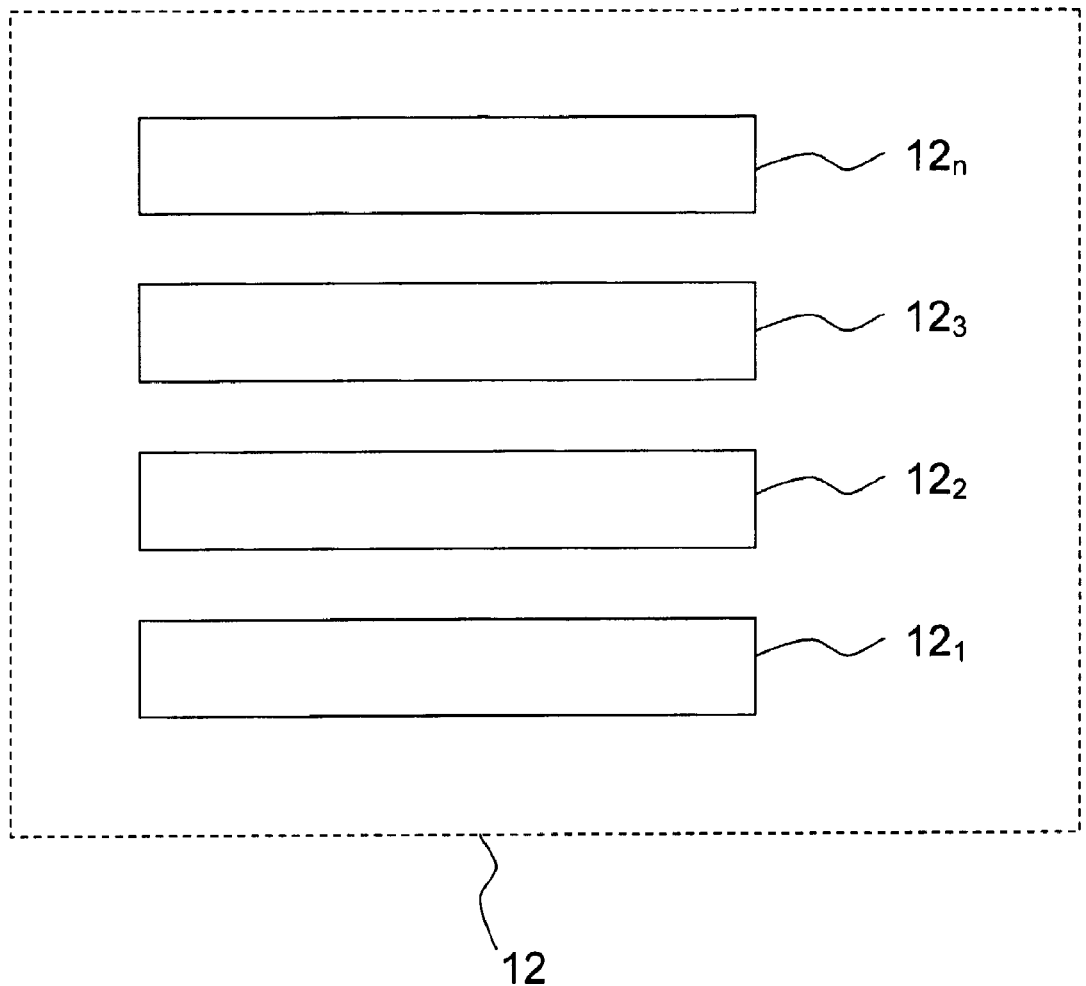
FIG. 2 schematically shows a first embodiment of a portable unit included in the alarm system shown in FIG. 1.

In FIG. 2, a first embodiment is schematically shown of a portable unit 12 included in the alarm system 10 shown in FIG. 1. As is seen in FIG. 2, each portable unit 12 comprises a basic module $12_1$, two intermediate modules $12_2$, $12_3$ as well as a protecting cover $12_n$. The basic module $12_1$, and the two intermediate modules $12_2$, $12_3$ are connected by means of data buses (not shown), in order to provide flexibility and possibilities for the adaptation to various needs.

It should also be pointed out that the portable unit 12 may comprise more than two intermediate modules.

When installation has been made, it is told via telephone, the Internet or other media in which type of environment and which surrounding the portable unit 12 is going to operate in.

The portable unit 12 gets a configuration with adapted default settings and then may, for instance, sound and vibration images "be recorded" in the unique environment and be stored in the portable unit 12 as well as in the database 24 located at another location. This recording may take place both automatically, which means that the unit will be self-supporting, or manually. In this way, systems having several units can be balanced. This is made in order to minimise false alarms by the fact that the sensitivity is calibrated.

The portable unit 12 is upgraded entirely via wireless communication.

It should also be pointed out that the portable unit 12 also may be activated and upgraded via non-wireless communication, i.e., permanent connection.

Figure 3:
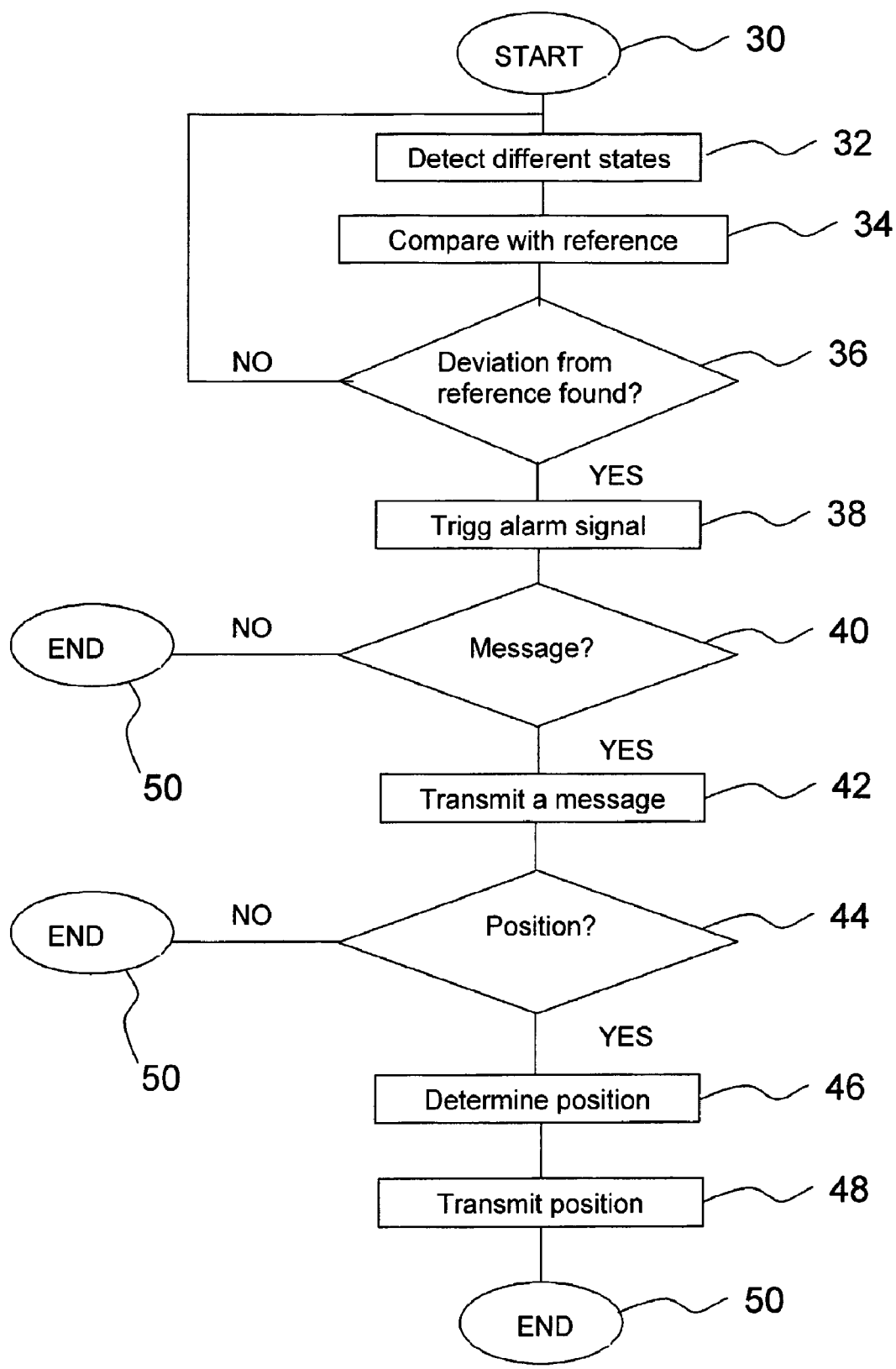
FIG. 3 shows a flow chart of a method for triggering an alarm signal according to the present invention.

In FIG. 3, a flow chart is shown of a method for triggering an alarm signal according to the present invention. The method is carried out by means of an alarm system 10 (compare FIG. 1) according to the present invention. The method begins at block 30. Next, the method continues, at block 32, with the step of: by means of the sensor system 14 (compare FIG. 1) detecting different states comprising at least one of vibrations relative position changes or accelerations. The method then continues, at block 34, with the step of: comparing the signals received from the sensor system 14 and at least one environment-dependent reference predetermined for a specific environment and stored in the memory member 24. The method then continues, at block 36, with a question if deviation from reference is found? Upon a negative answer to this question, the step is carried out according to block 32 again. If the answer, on the other hand, is affirmative, the method continues at block 38, with the step of: upon deviation from said environment-dependent reference/references, triggering an alarm signal. The method then continues at block 40, with a question if message is desired? Upon a negative answer to this question, the method is terminated at block 50. On the other hand, if the answer is affirmative, the method continues, at block 42, with the step of: according to instantaneous control or predetermined configuration, by means of the communication member of a unique identity, transmitting a message to at least one receiver. The method then continues, at block 44, with a question if the position should be found? Upon a negative answer to this question, the method is terminated at block 50. On the other hand, if the answer is affirmative, the method continues, at block 46, with the step of: according to instantaneous control or predetermined configuration, by means of the positioning member, determining the position of the portable unit 12. Next, the method continues, at block 48, with the step of: transmitting the position to the receiver/receivers. The method is then terminated at block 50.

According to a preferred embodiment of the method according to the present invention, the detection step comprises: the detection of different states by means of at least one of the following sensors: accelerometer/silicon crystal, microphone, frequency transmitters, strain gauges, camera, temperature sensors, UV/photocells, electronic noses, anemometers, infrared sensors, gamma transducers, laser sensors, inductive sensors, flow sensors, level transducers, tension gauges and pressure gauges.

According to a preferred embodiment of the method according to the present invention, the positioning step comprises: the determination of the position by means of at least one of the following units: GPS unit, GPRS unit and GSM unit.

According to a preferred embodiment of the method according to the present invention, the method furthermore comprises the step of: registering and in the memory member 24 storing the reference/references that may consist of a sound/vibration image specific to each portable unit 12.

Figure 4:
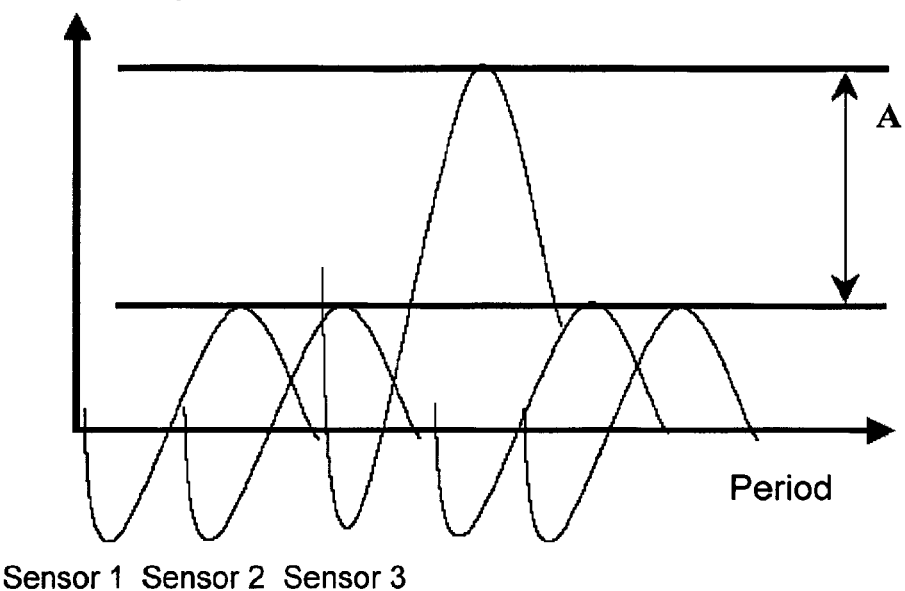
FIG. 4 shows two examples of sound/vibration images specific to a portable unit included in the alarm system shown in FIG. 1.
Figure 4:
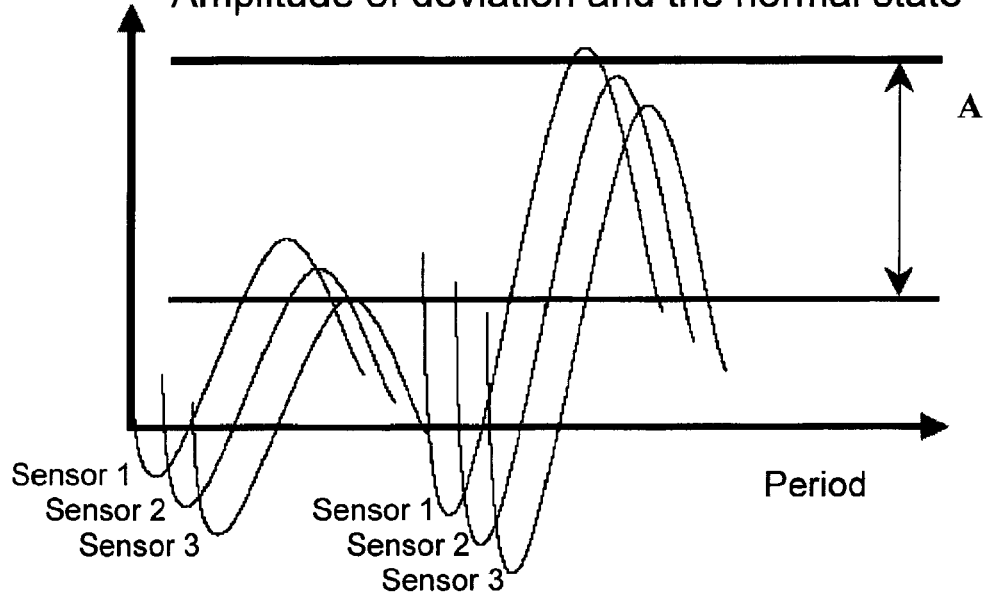

In FIG. 4, two examples are shown of sound/vibration images specific to a portable unit 12 included in the alarm system 10 shown in FIG. 1. The dynamic sensor system 14 records a "normal state" and may also use the stored sound/vibration images in the portable unit 12 locally or via wireless communication centrally in the memory member 24. Update and changes of acceptable sound/vibration image are carried out dynamically via wireless communication. In the examples shown in FIG. 4, three sensors are used in the sensor system 14. However, it should be pointed out that more sensors may be used depending on the application in question. In the graphs shown in FIG. 4, A indicates the deviation area, i.e., the area outside the recorded normal state. As is seen in the uppermost graph in FIG. 4, the signals from the sensors 1 and 2 are within the normal state, while the signal from the sensor 3 is outside the normal state, i.e., a deviation is detected. In order to be able to minimise sources of error and the risk of false alarm, it is normally not enough that only one sensor detects deviation from the normal state/reference for an alarm to be triggered. Therefore, it is generally required that three different types of sensors simultaneously detect deviation from references for an alarm to be triggered. This situation is schematically illustrated in the lower graph in FIG. 4. There, the signals from the sensors 1-3 are "simultaneously" outside the normal state, and therefore an alarm would be triggered in this case. It should be pointed out that the sound/vibration signals shown in FIG. 4, in the form of sinusoidal signals are just schematic. Normally, the sound/vibration signals are much more complex.

By the solution according to the present invention, an alarm system 10 is obtained, which is dynamic and may be developed and updated manually as well as automatically, entirely wireless via the Internet. Furthermore, the intelligence arises from the fact that a plurality of measuring and detecting methods being independent from each other are applied and generate data, which are processed and compared against memory and a database where different normal states are defined by threshold values/references.

A log registers all alarms that furthermore are stored in the database 24. These alarms are analysed and processed, and serve as a foundation for the adjustment of threshold values/references within given intervals and frames as well as for the production of, among other things, statistics. The following things can be identified, detected, measured, alarmed and reported. Very small deviations from the defined normal states/references of an alarmed object, for instance, deviating sound, mechanical loads, strains in material per unit, shocks, impacts and vibrations.

By sound, shock, impact, vibration, a micro motion in a material is intended and of different type, frequency, level as well as amplitude.

Since vibrations frequently are composite, it is of great importance to detect the phenomenon by a plurality of techniques being independent of each other and having a certain overlap.

It should be pointed out that two portable units 12 or more portable units 12 may be installed in pair or group installation where the portable units 12 can communicate with each other.

An example is, for instance, to mount a portable unit 12 in a boat and a second portable unit 12 in the outboard motor, where, for instance, photographing is effected upon dismounting of the motor hood and/or tampering with the boat.

The alarm system 10 according to the present invention may be used in order to alarm mobile objects such as, for instance, vehicles of all types, for instance, automobiles, motor cycles, mopeds, bicycles, trailer, caravan, boats, outboard motors, snowmobiles, jet-skis, lawnmower, contractor's machinery, heavy vehicles, lorries, buses, rail-mounted vehicles, barracks and stores on wheel as well as stationary, caddie cars, bags, boxes, skis, snowboards, roof boxes and miscellaneous other things.

Examples of stationary objects that may be alarmed are computers, machines and equipment, tool, tool cabinets, tool boxes, stores, wagons, carts, spaces, premises, beams, tubes, pipe supports, foundations, arches, gearboxes, pallets, collecting boxes, containers, ground installations, outdoor as well as indoor, traps in the nature, music systems in premises, for reporting/alarm of, e.g., sound levels, thresholds as well as miscellaneous other things.

The sensor signals may be compared and checked by a plurality of methods being independent from each other. Multisensor indication may be applied. It is possible, e.g., to require deviation signal from one or more sensors before the alarm should be triggered.

It is possible to decide that a call should be effected in order to check the status of the alarm and/or the environment, as it is possible to activate cameras, connection/disconnection of other equipment, also at other locations.

The driver of a vehicle may furthermore be provided with a portable unit 12, wherein a "man-overboard function" alarms if, e.g., the driver no longer is in contact with the portable unit 12 installed in the vehicle.

The alarm system 10 according to the present invention may be used in order to monitor a machine or another industrial unit.

If, for instance, the conditions for a gear housing are altered, let us say the oil level, another type of sound, vibrations and resonances are generated than what has been recorded and determined as "normal". This may then generate an alarm. Correspondingly, wear of different types generates other resonances and sound, which also may trigger an alarm upon deviation from a defined normal case.

Upon, e.g., a collision between two objects, one of which has a portable unit 12 installed, alteration of motion, retardation and/or acceleration may be detected and trigger an alarm. The positioning function finds the position of where the alarm was triggered, which enables the receipt of a log about what happened immediately before the collision, e.g., course, vibrations, speed and direction.

Another application for the alarm system 10 according to the present invention is, for instance, in bogie systems of road vehicles and rail-mounted vehicles in order to provide information when sound/vibration images with selected and defined threshold values have been exceeded at a certain level.

This makes it possible to alarm immediately when something unexpected or undesirable occurs, e.g., puncture or wear of railway wheels or tyres.

The solution according to the present invention is intelligent and dynamic, among other things by the fact that the portable unit 12 "records" the environment that it has been applied in, collects data by measuring a plurality of different environment-dependent sound/vibration sensors. The result of the recording/collection supplements the default settings and thereby the result is obtained that is defined as a normal state.

Deviations in sound/vibration images that have been stored in the memory and database in the basic configuration are then processed, analysed and compared.

The sound images, levels and tolerance width of deviations from normal state are based on data and results from different results from laboratories and real outcomes, which, among other things, are derived from "the recording" of the unique environment of the unique installation in question.

Furthermore, the system is interactive and can communicate bidirectionally in a plurality of different ways, among other things by GPRS, GSM and position can be generated by means of GPS and GSM. Accelerations, retardations, time measurement make that position changes can be calculated and transmitted at a chosen instant of time.

Figure 5:
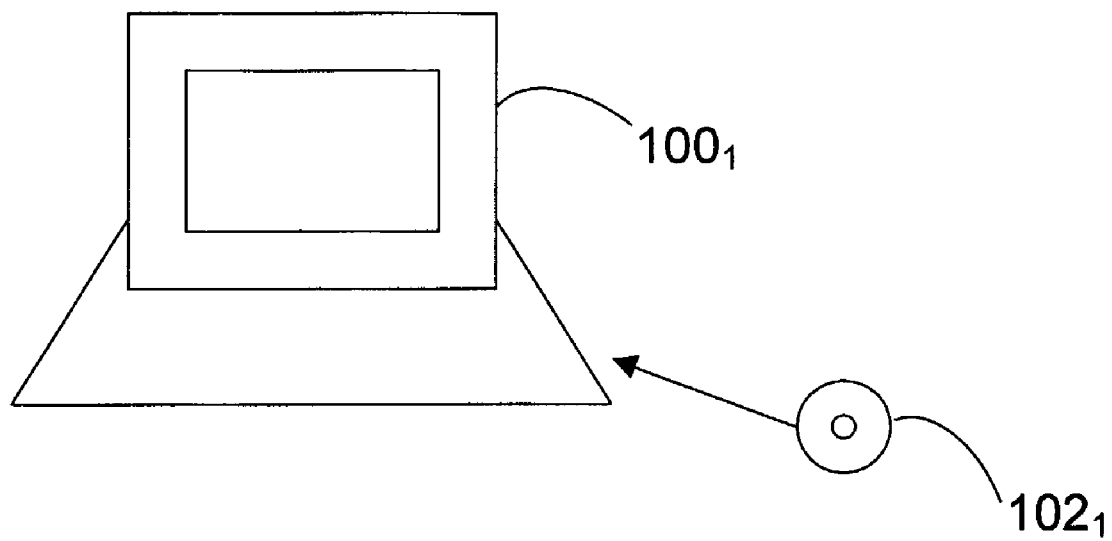
FIG. 5 shows a schematic image of some computer software products according to the present invention.
Figure 5:
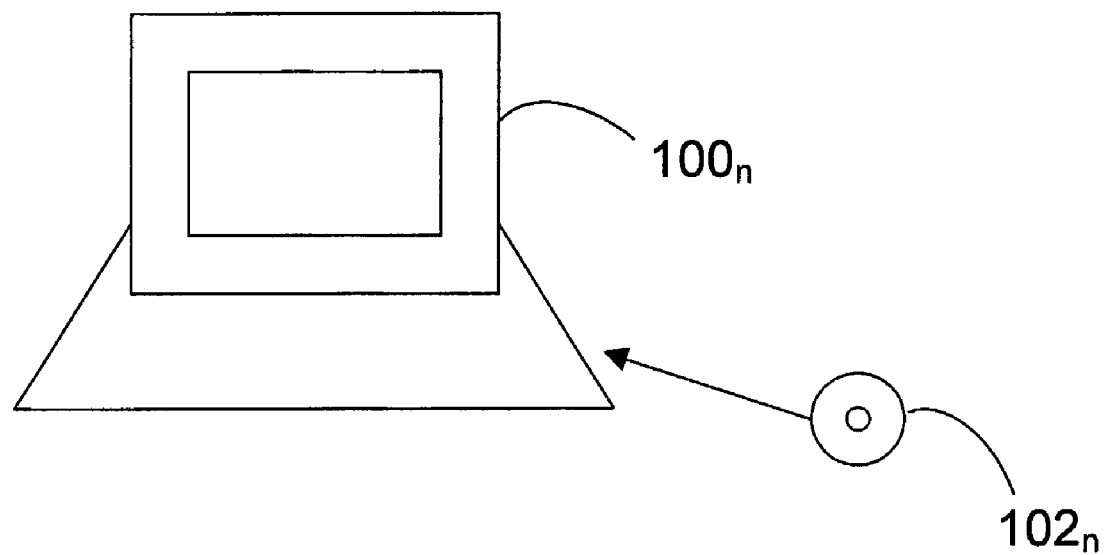

In FIG. 5, a schematic image is shown of some computer software products according to present invention. In FIG. 5, n different digital computers $100_1, \ldots, 100_n$ are shown, where n is an integer. In FIG. 5, n different computer software products $102_1, \ldots, 102_n$ are further shown, here shown in the form of CD discs. The different computer software products $102_1, \ldots, 102_n$ are directly loadable in the internal memory of the n different digital computers $100_1, \ldots, 100_n$. Each computer software product $102_1, \ldots, 102_n$ comprises software code portions for executing a part of or all the steps according to FIG. 3 when the product/products $102_1, \ldots, 102_n$ are run on said computer $100_1, \ldots, 100_n$. The computer software products $102_1, \ldots, 102_n$ may, for instance, be in the form of discs, RAM discs, magnetic tapes, magneto-optical discs or any other suitable products.

A device according to prior art provided with a vibration sensor, regardless which type, e.g., an accelerometer, is, among other things, limited in function, bandwidth and working spectra, e.g., temperature range, inertia, capacity, etc.

Figure 6:
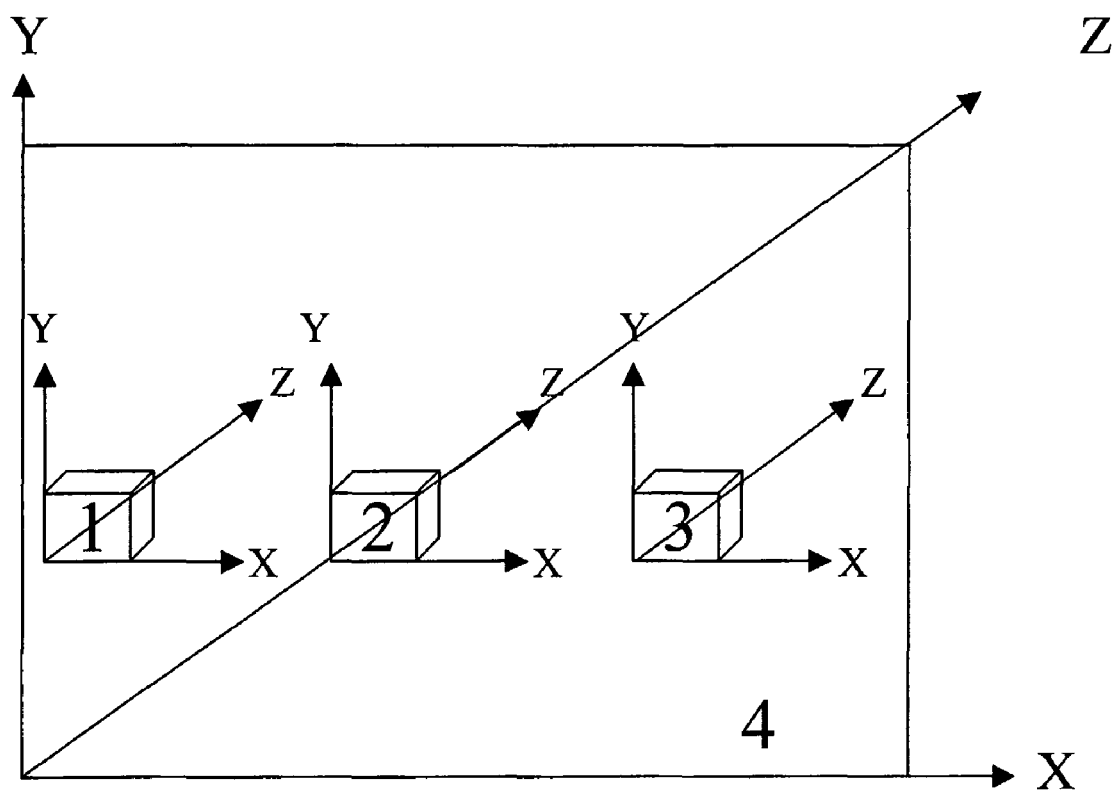
FIG. 6 shows a schematic image for illustrating the use of a triaxial accelerometer in the sensor system.

In FIG. 6, a schematic image is shown in order to illustrate the use of so-called triaxial accelerometers in the sensor system 14. Each accelerometer 1, 2 and 3 has three axes (x, y, z). In this case, the portable unit 12 is also a sensor 4 in itself having three axes. In this case, all sensors 1-4 have the capability of measuring and detecting values from each axis, and these can be processed in the process member 16. Logics can analyse and compare each axis separately, the respective value and value interval, etc., against contents and previous results in the memory and database/server and then control what should be done. Empirical values and decisions made are stored in the database/server in order to constitute a future reference. The solution shown in FIG. 6 entails at least 9×9×9×9 number of more possibilities of, e.g., different logic functions, modes of operation, and so on, than what a conventional solution can provide.

To sum up, the unit may be used as a relatively inexpensive product for alarm/monitoring of, for instance, lumber rooms, doors, vehicles, contractor's machinery, garages, pallets, computer rooms, etc., and/or for the operations monitoring of fans, motors, pumps, etc.

The unit is characterized in that:
- It is capable of reading temperature, time, translation, acceleration, retardation, vibrations in general, sound in general as well as specific sound/vibrations that arise from the alarmed/monitored object, so-called structure-borne sound.
- It is capable of learning by itself the normal state of a surrounding environment regarding structure-borne sound, but also other parameters.
- It has the capability of detecting deviations from the same normal state, which if they occur in patterns, results in that an alarm is given.
- Thereby, it can serve as a theft/tamper alarm that in a guaranteed way warns when theft/tampering is about to take place.
- In a simple, reliable way, it furthermore may be brought to monitor, for instance, environment in rooms, function of fans, pumps, etc., and that warns about all changes that take place in comparison with the normal state. Thus, it does not only warn if, for instance, the fan stops, but when it is about to stop/seize/break Furthermore
- The unit handles all communication via GPRS to the server, which in turn transfers data/alarm to the user. Communication over fixed Ethernet, Bluetooth, radio.
- Upon an alarm, the unit reports to suitable receivers, selected by the user, directly by SMS/voice message or e-mail.
- The unit is easily movable between different objects
- The unit offers built-in GPS
- The unit may readily be provided with and configured for external sensors for the measurement of, for instance, moisture ratio, voltage, amperage, etc.
- Each unit contains all functionality according to the above and a minimum of cords, installations, etc., are needed. Upon temporary alarming for a shorter time, not even cabling for the power supply is needed.
- The unit alarms itself (by a separate message type) if the battery voltage is low.
- The unit alarms if the connection to the server is broken within a predetermined time interval. If the unit is destroyed, the alarm is triggered.

Feasible Applications

Theft/Tamper Alarm for Computer Rooms, Storerooms, Doors, Conference Equipment, Vehicles, Diesel Tanks, Lumber Rooms, Tool Sheds, etc.

The unit applied as, or as a part of, a tamper/theft alarm means a relatively inexpensive and easy-to-use alarm solution both for mobile and stationary equipment having the following properties:
- Learns by itself the normal state of the monitored/alarmed object regarding in principle any parameters, electric circuits that are broken, light, IR detectors, etc., no other configuration is needed.
- Perceives and detects then emergence of structure-borne sound and/or changes of the position, temperature or other parameters of the monitored object in comparison with the normal state as well as changes of the structure-borne sound of the monitored object. The latter means that in principle no tampering/contact can be made on the object without alarming.
- Can then by itself warn the user or receiver(s) selected by the same quietly by message to mobile telephone, e-mail or other solutions.
- Can also be brought to control other processes or functions by itself, for instance siren, camera, light, door lock, etc.
- Can readily be mounted fixedly or temporarily on most objects.
- Is impossible to disconnect without specifying a four-digit code as well as ID via, for instance, mobile telephone, separate display or Internet access. Hence, theft of keys, breakage of power supply or tampering with the box does not prevent that the alarm is triggered.

Furthermore, the unit is:
- Provided with built-in GPS.
- In principle impossible to remove without alarming as well as, in the case of fixed mounting, extensive damage or time-consumption.
- User-friendly: Each unit may easily, by the end user, be programmed regarding
  What it should alarm upon
  What it should not alarm upon
  How alarm should be sent, i.e., by SMS/mobile telephone, radio . . .
  Possible activities that should be undertaken upon alarm, e.g., switching-on of (separate) siren, camera, etc.
- Constructed in an easily-handled format, less than a mobile telephone.
- Reliable in operation and in principle maintenance-free: Each alarm unit is provided with a battery that can serve as a back-up during a longer time (months).
- Movable: Each unit may readily, by the end user, be moved between different alarmed objects, and applications.

Mounting

The unit is mounted fixedly (mechanically), temporary (by tape or the like), or is only put in/on the object when temporary alarm is needed. The latter may be employed, for instance, upon temporary alarming of pallets, tool boxes, covers, etc.

Observe that alarming does not only take place if the alarmed object is removed or somehow destroyed, but directly when a theft is initiated. For instance, a door may be alarmed so that it alarms if anyone hits it, breaks it, wrenches it, begins to work/screw on it, or subjects it to other violence.

Therefore, upon alarm, the owner or a person trusted by him may directly turnout with the purpose of staving the crime/theft. If an alarmed mobile object in spite of all is removed and the unit has not been damaged, it may readily be traced via GPS.

Operations Monitoring Unit for Stationary Computers, Servers, Pumps, Fans, Motors, etc.

As operations monitoring unit, the unit may be used for the monitoring of in principle all parameters (temperature, moisture, amperage, voltage) in a specific environment as well as the structure-borne sound of the alarmed object. If the environment is altered or the structure-borne sound decreases, is altered in comparison with the normal state, or ceases, the operator is warned about this. Applied as such a system for preventive maintenance, the unit would have the following mode of operation and properties:

- Learns by itself the normal state of the monitored object, regarding in principle any parameters according to the above, no other configuration is needed.
- Then perceives and detects changes of chosen parameters in comparison with the normal state as well as structure-borne sound, i.e., sound and vibrations that originate from, and only from, the alarmed object. Therefore, warns/alarms if, for instance, a fan stops, but also already when the sound created by the fan is altered, i.e., long before the fan stops/seizes.
- Therefore, does not warn/alarm if work is carried out in the vicinity of the object, persons move around it, etc., as long as this does not directly affect the alarmed object by for instance contact. Hence, the risk of false alarm is minimised.
- Enables logging of events, i.e., how the outer environment as well as the structure-borne sound of the object have been altered over time, as well as when in such a case. Accordingly, the unit can serve as a "Black box".
- All communication takes place wireless, no wiring is needed in addition to electric cable.
- Built-in battery entails that the unit is relatively insensitive to power failure
- Is easy to mount, configure as well as handle in other respects.
- Alarms if the battery voltage is low.

Alarmed/monitored objects: servers, pumps, fans, motors, freezing equipment, generators, ventilation plants, etc.

According to the description above, the unit may readily be brought to detect disturbances in the power supply to, in principle, all machines, buildings, etc. Products for the detection and alarm of voltage drop are available on the market. However, these are relatively expensive and have only said functionality.

- The packaging is unique in so far as there are no inventions at all that, taken together, have the capabilities, properties, functions in such a format that readily can be controlled via a mobile telephone/remote unit. Certain functions may exist, there are many GSM/GPS solutions, but above all not product/thinks that measure vibrations/structure-borne sound that makes it possible to warn when something is about to happen.
- The fact that the product is impermeable and withstands UV light, makes many different fields of application possible
- It is simple to apply the product to a snow plough with the purpose of measuring how many times it has been put on the substrate that it should slide on (the roadway) and the time and distance the plough and the vehicle have been used.
- The product may be dug down under the ground and serve as a gauge for perceiving and registering when different categories of vehicles pass a specific point along a road section.
- It is simple to apply the product to, e.g., a girder construction, mast, crane jib or a bridge with the purpose of measuring and registering measured values of load levels, static as well as dynamic. For instance, as soon as maximum load and thereby maximally allowed strain in the material has been attained at a specific temperature.
- The product may be used for registering earthquakes
- The product may be used on different mobile and stationary objects in order to log and measure many different variables and parameters as well as be connected to external transducers and sensors. For instance, current, voltage, flow, pressure, . . . , etc., may be measured.
- The product may be used in order to measure structure-borne sound and vibrations in, among other things, computer servers with the purpose of allowing the prevention of a crash when, e.g., a fan is about to break.
- The product may be used to alarm works of art, such as, e.g., paintings, simply by applying the product in the object of art.
- In the application of pump stations to oil rigs on the bottom of the sea, application may be facilitated by applying the product in a pressure-proof shell and register the angles as well as the angular/distance changes (position by dead calculation).
- It is possible to apply the product in loaders in order to register and measure, e.g., deviating pressure shocks and/or other mechanical loads on machines and instruments.
- In lifts, it is possible to apply the product in order to measure, register deviations and alarm.
- In the hull of a boat, the product may be applied for the registration of groundings, strength, position, time.
- The product may readily be applied for occasional and permanent needs regardless application.
- The product may be applied in order to, e.g., alarm a pallet on, e.g., a loading dock and warn and/or connect cameras photographing by movable and/or still picture as soon as something affects the rest position of the pallet. It needs only be touched to alarm, and the sensitivity can be changed readily via the mobile telephone.
- It is simple to apply the product to e.g., a pallet to count pulses when, e.g., an industrial robot loads items on a pallet. When attaining a specific predetermined number of pulses, the product may start a conveyor and/or stop the robot as well as possibly other activities, such as warn the person responsible for the process.
- By means of the product, it is possible to readily alarm tool cabinets, tool boxes and other objects for occasional and/or permanent situations.
- For instance, on building sites, fairs, etc., it is possible to alarm computers, instruments, control cabinets, welds, compressors, electric utilities, machines and other things with the purpose of warning if any deviation from the normal state is about to take place.

Doors, windows, covers, electrically and manually maneuvered, may readily be alarmed with the purpose of preventing tampering, as well as that preventive maintenance, alarm upon power failure, etc., can be handled.

The power failure alarm function can be applied to any power-consuming apparatuses.

Cisterns, tanks and other types of storage of liquid and solid substances may readily alarmed, as well as it is possible to measure levels and other parameters.

It is possible to manually and automatically control various machines and items by, e.g., switching on/off.

It should also be pointed out that all units can communicate with each other via the server.

Factory, premises having a plurality of groups of units on machines, fans, pumps and cisterns.

Can be mounted on, e.g., cattle with the purpose of detecting deviations from normal state. It is, for instance, possible to detect if a horse gallops instead of trotting.

The invention is not limited to the described/embodiments. It will be evident to persons skilled in the art that many different modifications are feasible within the scope of the following claims.

The invention claimed is:

1. An alarm system intended to trigger an alarm signal upon deviation from at least one environment-dependent reference predetermined for a specific environment, the alarm system comprising:
    at least one portable unit having a size not greater than a mobile telephone and intended to be placed in said environment, each portable unit comprising:
        a sensor system that records a normal state of the environment when placed in the environment, the predetermined environment-dependent reference being comprised of at least a recorded sound/vibration image of the normal state of the environment in which the at least one portable unit is placed, the sensor system comprising an accelerometer/silicon crystal, microphone and temperature sensor, said accelerometer being triaxial,
        a processor member connected to the sensor system that compares signals received from the sensor system and said predetermined environment-dependent reference and that causes an alarm to be triggered upon determining an occurrence of a predetermined deviation of the signals received from the sensor system from the predetermined environment-dependent reference,
        a communication member of a unique identity connected to the processor member for wireless communication at least upon the triggering of the alarm signal, and
        a positioning member connected to the processor member that indicates, at least upon the triggering of an alarm signal, the position of said unit, and
    a memory member connected to the processor member via a distributed computer network, the memory member storing said predetermined reference for dynamic and interactive update and development for different purposes by maneuvering via fixed and/or mobile telephony and/or radio and/or computer unit.

2. The alarm system according to claim 1, wherein each sensor system further comprises at least one of the following sensors: frequency transmitters, strain gauges, a camera, UV/photocells, electronic noses, anemometers, infrared sensors, gamma transducers, laser sensors, inductive sensors, flow sensors, level transducers, tension gauges and pressure gauges.

3. The alarm system according to claim 1, wherein each positioning member is comprised of at least one of the following units: GPS unit, GPRS unit and GSM unit.

4. The alarm system according to claim 1, wherein each portable unit comprises at least one basic module, as well as a protecting cover.

5. The alarm system according to claim 1, wherein the memory member continuously stores comparisons and/or deviations.

6. The alarm system according to claim 1, wherein the memory member is comprised of a database.

7. A method for triggering an alarm signal by means of an alarm system comprised of at least one portable unit having a size not greater than a mobile telephone and intended to be placed in an environment, each portable unit comprising a sensor system that records a sound/vibration image of a normal state of the environment in which the at least one portable unit is placed while the portable unit is in the environment, the sensor system comprising an accelerometer/silicon crystal, microphone and temperature sensor, the accelerometer being triaxial, a processor member connected to the sensor system that compares signals received from the sensor system and a recorded predetermined environment-dependent reference, a communication member of a unique identity connected to the processor member and adapted for wireless communication at least upon the triggering of an alarm signal, and a positioning member connected to the processor member and adapted to indicate, at least upon the triggering of an alarm signal, the position of said unit, a memory member connected to the processor member via a distributed computer network, and for dynamic and interactive update and development for different purposes by maneuvering via fixed and/or mobile telephony and/or radio and/or computer unit, the method comprising the steps of:
    by means of the sensor system, detecting different states comprising vibrations, relative position changes, accelerations and temperature, wherein said accelerations are detected against three axes;
    comparing the signals received from the sensor system and the at least one environment-dependent reference predetermined for a specific environment and stored in the memory member, the predetermined environment-dependent reference being at least a sound/vibration image of the recorded normal state of the environment in which the at least one portable unit is placed;
    upon deviation of signals received from the sensor system from said environment-dependent reference, triggering an alarm signal; and
    according to instantaneous control or predetermined configuration, by means of the communication member of a unique identity, transmitting a message to at least one receiver; and
    according to instantaneous control or predetermined configuration, by means of the positioning member, determining the position of the unit;
    transmitting the position to the at least one receiver; and
    dynamically and interactively updating and developing said memory member for different purposes by maneuvering via fixed and/or mobile telephony and/or radio and/or computer unit.

8. The method according to claim 7, wherein the detection step comprises:
    detecting different states by means of an accelerometer/silicon crystal, microphone and a temperature sensor.

9. The method according to claim 8, wherein the detection step further comprises:
   detecting different states by means of the following sensors: frequency transmitters, strain gauges, a camera, UV/photocells, electronic noses, anemometers, infrared sensors, gamma transducers, laser sensors, inductive sensors, flow sensors, level transducers, tension gauges and pressure gauges.

10. The method according to claim 7, wherein the positioning step comprises:
    determining the position by means of at least one of the following units: GPS unit, GPRS unit and GSM unit.

11. The method according to claim 7, wherein the method further comprises the step of:
    registering, and in the memory member, storing the environment-dependent reference which is comprised of the sound/vibration image that is specific to the portable unit.

12. At least one computer software product directly downloadable in the internal memory of at least one digital computer, comprising software code portions for executing the steps according to claim 7 when said at least one product is run on said at least one computer.

13. The alarm system according to claim 1, wherein the state comprises at least one of vibrations, relative position changes or accelerations.

14. The alarm system according to claim 1, wherein the predetermined environment-dependent reference is default settings for the portable unit supplemented by the recorded normal state of the environment.

15. The alarm system according to claim 1, wherein the sensor system is comprised of a plurality of different environment-dependent sound/vibration sensors.

16. The alarm system according to claim 1, wherein the sensor system is comprised of a plurality of different types of sensors and wherein an alarm signal is triggered when at least three different types of sensors simultaneously detect deviation from corresponding predetermined environment-dependent references stored in the memory member.

17. The alarm system according to claim 1, wherein the recorded image is a sound/vibration image.

18. The alarm system according to claim 1, wherein the recorded image is a recording of an amplitude of at least one parameter of the normal state of the environment varying over a specified period.

19. The method according to claim 7, wherein the recorded image is a sound/vibration image only.

20. The method according to claim 7, wherein the recorded image is a recording of an amplitude of at least one parameter of the normal state of the environment varying over a specified period.

* * * * *